US009100392B2

(12) United States Patent
Hubner et al.

(10) Patent No.: US 9,100,392 B2
(45) Date of Patent: Aug. 4, 2015

(54) METHOD AND APPARATUS FOR PROVIDING USER AUTHENTICATION AND IDENTIFICATION BASED ON A ONE-TIME PASSWORD

(71) Applicant: Verizon Patent and Licensing Inc., Basking Ridge, NJ (US)

(72) Inventors: Paul V Hubner, McKinney, TX (US); Robert A Clavenna, II, Lucas, TX (US); Steven T. Archer, Dallas, TX (US); Peter Tippett, Great Falls, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/033,103

(22) Filed: Sep. 20, 2013

(65) Prior Publication Data

US 2015/0089607 A1    Mar. 26, 2015

(51) Int. Cl.
*H04L 29/06*    (2006.01)
(52) U.S. Cl.
CPC ................................. *H04L 63/0838* (2013.01)
(58) Field of Classification Search
None
See application file for complete search history.

(56) References Cited

U.S. PATENT DOCUMENTS

| | | | | |
|---|---|---|---|---|
| 6,259,909 | B1 * | 7/2001 | Ratayczak et al. | 455/411 |
| 7,590,847 | B2 * | 9/2009 | Jenisch et al. | 713/172 |
| 8,024,576 | B2 * | 9/2011 | Gargaro et al. | 713/183 |
| 2007/0113294 | A1 * | 5/2007 | Field et al. | 726/27 |
| 2010/0299731 | A1 * | 11/2010 | Atkinson | 726/6 |
| 2011/0289576 | A1 * | 11/2011 | Cheng | 726/9 |
| 2012/0066749 | A1 * | 3/2012 | Taugbol et al. | 726/6 |

OTHER PUBLICATIONS

Tanaka et al., A Method and Its Usability for User Authentication by Utilizing a Matrix Code Reader on Mobile Phones, 2007, Springer-Verlag, WISA 2006, LNCS 4298, pp. 225-236.*

* cited by examiner

*Primary Examiner* — Minh Dinh

(57) ABSTRACT

An approach is provided for authenticating and/or identifying a user through machine-transferrable one-time password codes. A user device sends to an authentication platform a request for a one-time password for authenticating a user at a relying party device. A machine readable form of the one-time password deliverable to the relying party device over an air gap between the user device and the relying party device is determined and transmitted. The relying party device reverts the machine readable form back to the one-time password, and transmits the one-time password to the authentication platform to authenticate the user device.

20 Claims, 9 Drawing Sheets

US 9,100,392 B2

METHOD AND APPARATUS FOR PROVIDING USER AUTHENTICATION AND IDENTIFICATION BASED ON A ONE-TIME PASSWORD

BACKGROUND INFORMATION

Given the reliance on computers, computing devices (e.g., cellular telephones, laptop computers, personal digital assistants, and the like), and automated systems (e.g., automated teller machines, kiosks, etc.) to conduct secure transactions and/or access private data, user authentication is critical. Traditional approaches to user authentication involve utilizing user identification and one-time passwords (OTPs) distributed through a secure channel provide an additional level of security to a login authentication. Unfortunately, manual translation of these OTPs from the offpath channel device to the requesting relying party device (i.e., across the "air gap") can lead to errors. In short, authentication mechanisms that rely on traditional one-time passwords pose security risks. Therefore, there is a need for an approach that can use one-time passwords with minimal human interaction and translation errors.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for authenticating based on machine-transferrable one-time password codes are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

As used herein, the term "machine-transferrable one-time password code" refers to any form of nonhuman-input communication wherein one or more one-time passwords are communicated, either in place of human-input one-time passwords, or together and in parallel with human-input one-time passwords. The term "one-time password" refers to a password that is valid for only one login session (e.g., enterprise network) or transaction (e.g., bank account), and/or for a predetermined period of time then expires. Machine-transferrable one-time password codes can include one or more images (e.g., text, 2D graphic, 3D graphic, etc.) of the one-time passwords: "as is," scrambled, encrypted, watermarked, etc. that is on a user device, or another device (e.g., a smart phone, TV, set-top box, kiosk, rental media player, etc.) controlled by and/or in the proximity of the user device, etc., one or more audio signals (e.g., machine-generated sound, tone, volume, pitch, expression, pronunciation, pauses, accents, emphasis; and of course, periods of silence, etc.) of the one-time password "as is," scrambled, encrypted, etc. that is rendered via the user device, or another device (e.g., a smart phone, TV, set-top box, kiosk, rental media player, speaker, intercom, etc.), one or more machine readable signals and/or codes (e.g., propagating electrical or/and electromagnetic signals, such as LED lights (in time sequence, in visual array, etc.), Bluetooth, near field communications, etc.), radar, Infrared (IR), etc.

Figure 1:
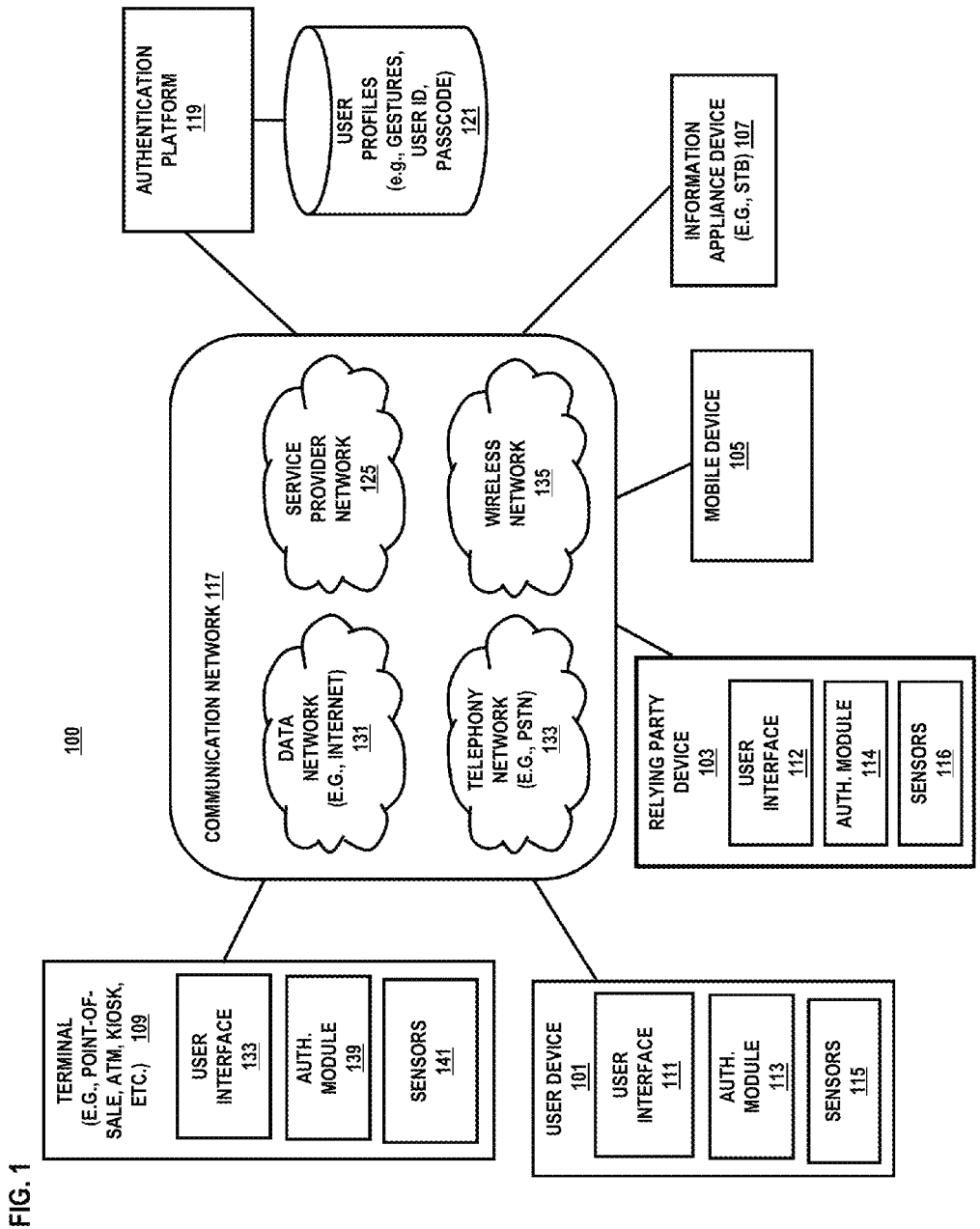
FIG. 1 is a diagram of a system capable of authenticating via machine-transferrable one-time password codes, according to an exemplary embodiment.

FIG. 1 is a diagram of a system capable of authenticating via machine-transferrable one-time password codes, according to an exemplary embodiment. Generally, multifactor authentication provides a stronger level of authentication than single factor authentication. For example, requesting multiple types or numbers of authentication credentials can ensure a higher level of authentication than requesting a single set of authentication credentials. In other words, by increasing the number of authentication factors, the authentication strength can be greatly improved. A one-time password (OTP) is used in conjunction with other authentication factors to increase security. The authentication factors working in conjunction with OTPs may include the static passwords, machine-transferrable OTP codes (e.g., facial features of a user), etc.

One-time passwords avoid replay attacks such as recording an OTP, since OTPs can be used only once. One-time passwords also avoid dictionary attacks, phishing, keyboard logging, interception, and other security breaches. However, OTPs are difficult for human beings to memorize, and thus subject to a greater likelihood of human entry errors.

As a result, a system 100 of FIG. 1 introduces the capability to use machine-transferrable one-time password codes carried through image, sound, vocal, or a combination thereof. The system 100 includes a user, a trust system with media capabilities that needs authentication (e.g., a PC or an website, etc.) from the user, a network with access to a one-time password (OTP) framework/platform (e.g., Verizon Universal Identity Services (UIS)), and an off-path device (e.g., a smart phone, tablet, etc.) with media capabilities and a software client to relay the OTP back to the trust system.

Although various embodiments are discussed with respect to machine-transferrable visual one-time password codes, it is contemplated that the various embodiments described herein are applicable to any type of machine-transferrable one-time password codes (e.g., machine-transferrable audio one-time password codes, transitory/wireless machine-transferrable one-time password codes, and the like).

In one embodiment, the user opens a browser and accesses the off-path device that requires user authentication. The website prompts for a User ID and One-time Password. The user submits the User ID based upon which the UIS recognizes the user and creates/sends a one-time password (OTP) via a user's predefined, off-path channel to the user's device. The user device can execute an authentication maneuver involving at least one authentication factor that includes one or more automated OTP transfers and conversion, such as converting an OTP (e.g., 12345678) into a barcode, Quick Response (QR) code, audio tones (e.g., DTMF, musical phrases or human inaudible frequencies), pat, data for transmission over near field communications (NFC), ad-hoc WiFi, Bluetooth, Z-Wave, XBee, other local RF communications, or a combination thereof.

The system 100 (specifically, authentication platform 119 in combination with devices 101, 103) then converts/transfers or captures/reverts, by way of example, one or more machine-transferrable visual one-time password codes (e.g., images or videos) to provide a more authoritative authentication/identification of a user. By way of example, the video can be in a format, e.g., Moving Picture Experts Group (MPEG) format (e.g., MPEG-2 Audio Layer III (MP3)), Windows® media format (e.g., Windows® Media Video (WMV)), Audio Video Interleave (AVI) format, as well as new and/or proprietary formats.

The machine-transferrable one-time password codes (e.g., machine-transferrable visual one-time password codes) can be recognized, identified, and reverted back to the one-time password by the off-path device to transmit to the system to authenticate the user.

By way of illustration, typical machine-transferrable visual one-time password codes include, but are not limited to, human visible images (e.g., text, 2D graphic, 3D graphic, etc.). These machine-transferrable visual one-time password codes include bar codes, QR codes, icons, avatars, etc. Non-human visible machine-transferrable one-time password codes may also be used. For example, near infrared (NIR) signals, the Medium Wavelength IR (MWIR) signals and the Long Wavelength or Far Infrared (LWIR or FIR) signals may constitute nonhuman visible machine-transferrable OTPs, though other animals may experience them, etc. In one embodiment, any machine-transferrable one-time password code capable of being captured can be converted by the user device 101 and then captured via the air gap by the relying party device 103 of the system 100 for processing.

For the purpose of illustration, the system 100 includes various devices 101-109, each of which is configured with respective cameras or other imaging devices to provide user authentication/identification based on unique machine-transferrable one-time password codes (e.g., machine-transferrable visual one-time password codes and optionally in conjunction with facial/voice recognition or other authentication credentials). Such machine-transferrable one-time password codes can serve as authentication credentials to verify the identity of or otherwise authenticate the user.

By way of example, when a user attempts to login using an authentication service supported by the system 100, the user may open a browser on the user device 101 (e.g., a user's registered device, such as a cell phone) and access the relying party (RP) device 103 that requested user authentication. The website displayed on the user device 101 prompts a user ID and a one-time password. The user submits the user ID at the user device 101. At this point, the system 100 recognizes the user ID, creates a one-time password, and sends the OTP via a user's predefined, off-path channel to the user device 101.

The one or more machine-transferrable one-time password codes may be selected by the system 100, by a user at the user device 101, and/or a user at the relying party device 103. In one embodiment, the system 100 selects the one or more machine-transferrable one-time password codes based on user preference. In another embodiment, the system 100 selects the one or more machine-transferrable one-time password codes based on the capabilities of the devices 101, 103 (e.g., speaker, microphone, etc.)

In another embodiment, the user at the user device 101 creates a local QR code or local audio tones based on a received one-time password. In another embodiment, the relying party device 103 requests the system 100 to "Send QR code" or "Send audio tones."

In one embodiment, the machine-transferrable one-time password code data is automatically generated and/or retrieved by the platform 119 from the backend data and/or external information sources, for example, in a vector format. In another embodiment, the machine-transferrable one-time password code data is generated at the user device based upon user personal data, online interactions and related activities with respect to a specific authentication maneuver.

In one embodiment, the machine-transferrable one-time password code data can be used for authentication and/or identification, whereby one or more actions may be initiated based upon results of the authentication and/or identification. The actions may be granting access to one or more resources, reporting failed authentication and/or identification, taking actions against illegal access attempts, etc.

In this example, the user device 101 includes a user interface 111, which in one embodiment, is a graphical user interface (GUI) that is presented on a display (not shown) on the device 101 for capturing machine-transferrable visual one-time password codes via the camera. As shown, an authentication module 113 resides within the user device 101 to convert a one-time password into one or more machine-transferrable one-time password codes. As such, the approach of system 100 can authenticate without using human entries, thereby avoiding human entry errors.

By way of example, the user device 101 can be any type of computing device including a cellular telephone, smart phone, a laptop computer, a desktop computer, a tablet, a web-appliance, a personal digital assistant (PDA), and etc. Also, the approach for authenticating users, as described herein, can be applied to other devices, e.g., terminal 109, which can include a point-of-sale terminal, an automated teller machine, a kiosk, etc. In this example, user device 101 has a user interface 111, and authentication module 113, and sensors (e.g., camera) 115 that permit users to convert a one-time password into one or a set of machine-transferrable OTP codes, whereby the user device 101 can transport the one or a set of machine-transferrable OTP codes over an air gap to the relying party device 103 for user verification by an authentication platform 119.

The authentication approach can be deployed within the relying party device 103; as such, the device 103 (e.g., a set-top box, a personal digital assistant, etc.) utilizes a user interface 112 that operates with an authentication module 114 and sensor(s) 116 to permit access to the resources of the device 103, for instance. By way of example, the relying party device 103 can include a PC, an automated teller machine (ATM), a kiosk, a point-of-sales (POS) terminal, a vending machine, etc.

In one embodiment, one or more of the sensors 116 of the relying party device 103 determines, for instance, the one or a set of machine-transferrable OTP codes received over the air gap, such as images, sound and light, pressures, etc. A range and a scale of the sensor data may be defined for each element (images, sound and light, pressures, etc.). By way of example, a sound may be measured in decibel (dB), or range as low, medium and loud. The sensor data can be used by the authentication platform 119 to authenticate the user.

The relying party device 103 and/or the sensors 116 are used to determine the one or a set of machine-transferrable OTP codes. The sensors 116 can be independent devices or incorporated into the relying party device 103. The sensors 116 may include an accelerometer, a gyroscope, a compass, a GPS device, microphones, touch screens, light sensors, or combinations thereof. The sensors 116 can be a microphone, a camera, a keyboard, a light detector, a Bluetooth receiver, a NFC receiver, a radar receiver, a head/ear phone, a wrist device, a pointing device, or a head mounted display. By way of example, a camera built into the relying party device 103 determines a QR code displayed on the screen of the user device 101. The user can wear a device around a waist, wrist, knee, ankle, etc., to determine machine-transferrable OTP codes.

In one embodiment, the relying party device 103 has a built-in light detector. The OTP light data is converted back to the OTP transmitted to the user device 101 and sent to the system 100 for authenticating the user. The OTP light data can be used independently or in conjunction with visual/audio features to authenticate the user.

Other devices can include a mobile device 105, or any information appliance device 107 (e.g., STB) with an authentication module and one or more sensors. In one embodiment, terminal 109 (e.g., point of sale, ATM, kiosk, etc.) can be implemented to include a user interface 133, an authentication module 139 and one or more sensors 141, similar to those of the user device 101. It is observed that the described devices 101-109 can store sensitive information as well as enable conducting sensitive transactions, and thus, require at a minimum the ability to authenticate the user's access to these resources.

The authentication platform 119 maintains a user profile database 121 that is configured to store user-specific machine-transferrable one-time password code format selections along with the user identification (ID) of subscribers to the authentication service, according to one embodiment. Users may establish one or more sub-profiles including referencing machine-transferrable one-time password code format as well as other authentication credentials such as usernames, passwords, codes, personal identification numbers (PINs), etc. relating to user authentication as well as user accounts and preferences. While user profiles database 121 is depicted as an extension of service provider network 125, it is contemplated that user profiles database 121 can be integrated into, collocated at, or otherwise in communication with any of the components or facilities of system 100.

Moreover, database 121 may be maintained by a service provider of the authentication platform 119 or may be maintained by any suitable third-party. It is contemplated that the physical implementation of database 121 may take on many forms, including, for example, portions of existing repositories of a service provider, new repositories of a service provider, third-party repositories, and/or shared-repositories. As such, database 121 may be configured for communication over system 100 through any suitable messaging protocol, such as lightweight directory access protocol (LDAP), extensible markup language (XML), open database connectivity (ODBC), structured query language (SQL), and the like, as well as combinations thereof. In those instances when database 121 is provided in distributed fashions, information and content available via database 121 may be located utilizing any suitable querying technique, such as electronic number matching, distributed universal number discovery (DUNDi), uniform resource identifiers (URI), etc.

Communication network 117 may include one or more networks, such as data network 131, service provider network 125, telephony network 133, and/or wireless network 135. As seen in FIG. 1, service provider network 125 enables terminal 109 to access the authentication services of platform 119 via communication network 117, which may comprise any suitable wireline and/or wireless network. For example, telephony network 133 may include a circuit-switched network, such as the public switched telephone network (PSTN), an integrated services digital network (ISDN), a private branch exchange (PBX), or other similar networks. Wireless network 135 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), third generation (3G), fourth generation (4G) Long Term Evolution (LTE), etc., as well as any other suitable wireless medium, e.g., microwave access (WiMAX), wireless fidelity (WiFi), satellite, and the like. Meanwhile, data network 131 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 125 and 131-135 may be completely or partially contained within one another, or may embody one or more of the aforementioned infrastructures. For instance, service provider network 125 may embody circuit-switched and/or packet-switched networks that include facilities to provide for transport of circuit-switched and/or packet-based communications. It is further contemplated that networks 125 and 131-135 may include components and facilities to provide for signaling and/or bearer communications between the various components or facilities of system 100. In this manner, networks 125 and 131-135 may embody or include portions of a signaling system 7 (SS7) network, or other suitable infrastructure to support control and signaling functions. While specific reference will be made hereto, it is contemplated that system 100 may embody many forms and include multiple and/or alternative components and facilities.

In one embodiment, a complex grouping of machine-transferrable one-time password codes can be created either in series (e.g., a set of LED flash pattern and then audio tones of the end of "The Star-Spangled Banner", etc.), in parallel (e.g., a set of LED flash pattern concurrently with the audio tones), or both. This, for instance, ensures that users have more freedom to define unique machine-transferrable one-time password codes. In this way, only a specifically identified user may perform one or a set of machine-transferrable one-time password codes and be recognized to have caused the one or set of machine-transferrable one-time password codes.

In other embodiments, the system 100 provides for increased authentication factors by combining one or more machine-transferrable one-time password code with other authentication mechanisms such as image recognition (e.g., facial recognition), etc. The occurring process of each machine-transferrable OTP code (e.g., timing, ranging, etc.), the transitions/interfaces in-between machine-transferrable one-time password codes (e.g., an occurring order of the machine-transferrable one-time password codes, timing and ranging of overlaps or interval in-between machine-transferrable one-time password codes), etc., some or all of the authentication factors can be recorded as an OTP feature vector, an OTP sequence feature vector, an OTP transition vector, an multifactor authentication vector, or a combination thereof, in an authentication database for user authentication and/or identification. Each of such entry in the database constitutes an authentication signature of the user. The system 100 deploys the vectors based upon the context of the user authentication and/or identification, access policies, etc.

By way of example, an OTP feature vector of a machine-transferrable visual OTP code includes shapes/sizes/positions/timing/ranging of one or more visual objects (e.g., happy face, crying face, angry face, etc.) displayed on the user device that constitutes a machine-transferrable visual one-time password code. An OTP sequence feature vector of a sequence of machine-transferrable OTP codes includes types/timing/ranges of machine-transferrable visual OTP codes (e.g., happy face, crying sound, LED pluses, etc.) rendered on the user device that constitutes a machine-transferrable OTP code sequence. An OTP transition vector includes timing and range between two or more machine-transferrable OTP codes. A multifactor authentication vector includes the types/timing/ranges of at least one machine-transferrable OTP code and at least one other authentication mechanism (e.g., passive password, facial feature, etc.).

After recording the authentication signatures, the system 100 can use one or more of the authentication signatures for user authentication and/or identification. By way of example, a city bicycle sharing system can identify a paid user by one textual password image on a smart phone that was issued via an SMS message. As another example, a credit card company can use the system 100 to authenticate a card holder by the types and sequence of their machine-transferrable OTP codes.

Therefore, the approach of system 100, according to certain exemplary embodiments, utilizes one or more machine-transferrable one-time password codes (e.g., multiple authentication factors such as both image recognition and machine-transferrable one-time password code recognition) to produce strong authentication with relatively more ease. That is, the user may deploy one or a sequence of machine-transferrable one-time password codes without human entry errors.

Figure 2:
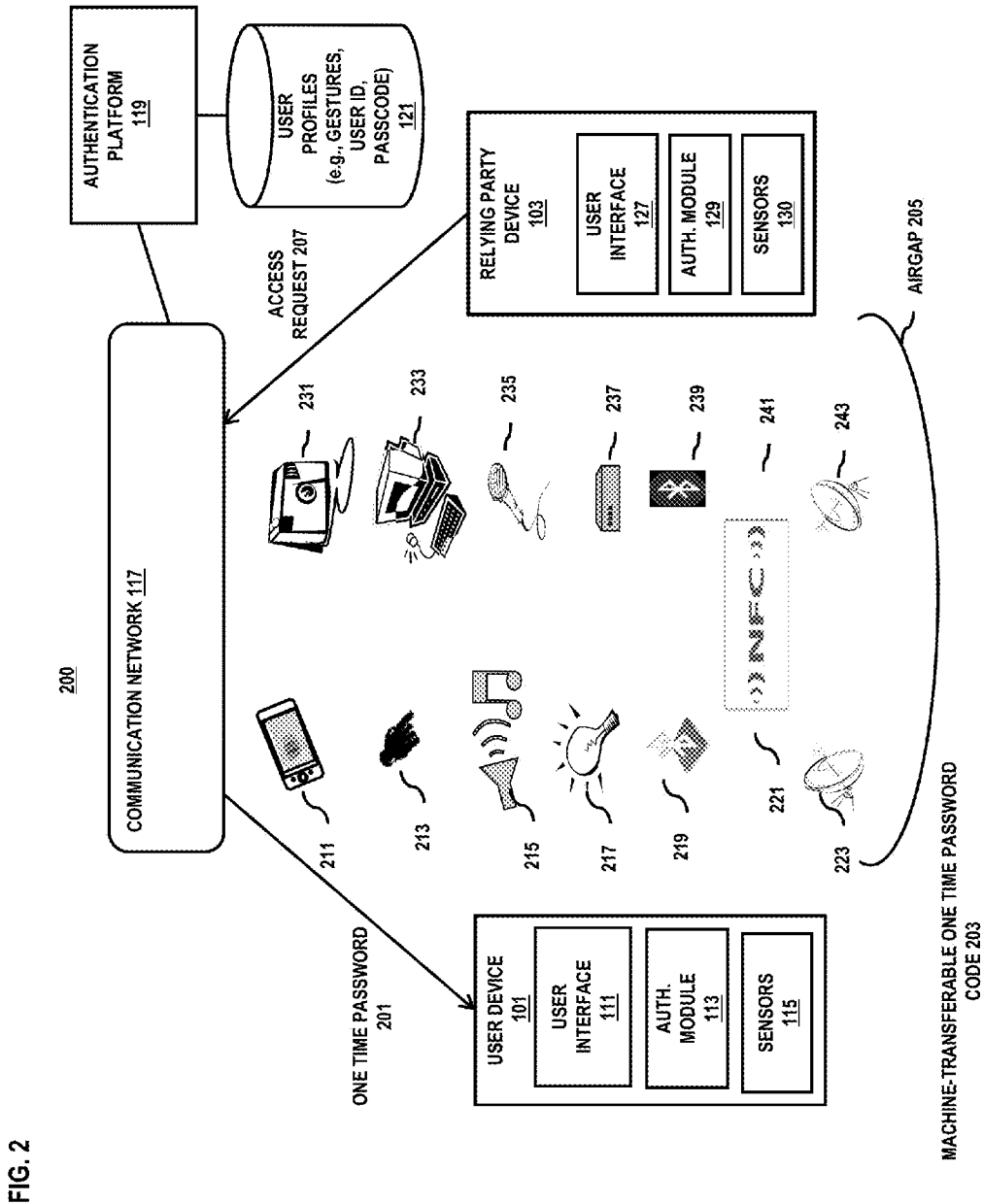
FIG. 2 is a diagram of providing authentication and/or identification through machine-transferrable one-time password code forms/types, according to various exemplary embodiments.

FIG. 2 is a diagram of providing authentication and/or identification through machine-transferrable one-time password code forms/types, according to various exemplary embodiments. In one embodiment, when a user attempts to login, for example, an online auction website, using an authentication service supported by the system 100, the user opens a browser on the user device 101 at a point of sale to access the relying party device 103 (e.g., a check-out reader) that requests user authentication. The website displayed on the user device 101 prompts for a user ID (e.g., John) and a one-time password. The user submits the user ID at the user device 101. If the system 100 recognizes the user ID, the system 100 creates a one-time password 201, and sends it via a user's predefined, off-path channel to the user device 101.

Thereafter, the user device 101 converts the one-time password 201 (e.g., 12345678) into a machine-transferrable one-time password code 203 "as is" (e.g., 12345678), scrambled (e.g., 56781234), encrypted (e.g., *&^!0D), watermarked, etc., and displays the code 203 on its own user interface or on the user interface of one or more devices (e.g., a smart phone, TV, set-top box, kiosk, rental media player, etc.) in its proximity. The machine-transferrable one-time password code 203 is then transferred via an air gap 205 to the relying party device 103. The relying party device 103 then reverts the machine-transferrable one-time password code 203 back to the one-time password 201, and sends it to the system 100 for authenticating the user.

In one embodiment, the user device 101 displays the machine-transferrable one-time password code 203 as an image (e.g., text, 2D graphic, 3D graphic, etc.) on its own screen or on the screen of a stand-alone device 211.

On the receiving side, the relying party device 103 uses a built-in camera or a stand-alone camera 231 to capture the machine-transferrable one-time password code 203. Visual machine-transferrable one-time password code recognition can be conducted with techniques such as computer vision, image processing, etc. By way of example, computer vision involves capturing machine-transferrable one-time password codes rendered via a computing device (e.g., tablet, smart phone, laptop, etc.).

As an additional authentication mechanism, the user manually 213 enters the one-time password 201 into an input device (e.g., a keyboard, a mouse, a touch screen, etc.) 233 of the relying party device 103 or one or more devices (e.g., a smart phone, TV, set-top box, kiosk, rental media player, etc.) in its proximity.

In one embodiment, the user device 101 renders the machine-transferrable one-time password code 203 as audible signals (e.g., sound, tone, volume, pitch, expression, pronunciation, pauses, accents, emphasis; and of course, periods of silence, etc.) on its own speaker 215 or on the speaker of a stand-alone device (e.g., a smart phone, TV, set-top box, kiosk, rental media player, speaker, intercom, etc.). On the receiving side, the relying party device 103 uses a built-in or stand-alone microphone 235 to capture the machine-transferrable one-time password code 203.

For example, known methods of sound/voice analysis may be used to analyze the melody, bass line, and/or chords in sound/voice. Such methods may be based on, for example, using frame-wise pitch-salience estimates as features. These features may be processed by an acoustic model for note events and musicological modeling of note transitions. The musicological model may involve key estimation and note bigrams which determine probabilities for transitions between target notes. A transcription of a melody or a bass line may be obtained using Viterbi search via the acoustic model. Furthermore, known methods for beat, tempo, and downbeat analysis may be used to determine rhythmic aspects of sound/voice. Such methods may be based on, for example, measuring the degree of sound change or accent as a function of time from the sound signal, and finding the most common or strongest periodicity from the accent signal to determine the sound tempo.

In one embodiment, the user device 101 renders the machine-transferrable one-time password code 203 as light signals via one or more built-in LED light emitters or on stand-alone LED device 217. The machine-transferrable one-time password code 203 may be encoded into various colors, volumes, patterns, pauses, etc. transferred via one or more LED emitters. By way of example, "0" is coded as "green LED light" while "1" is coded as "red LED light," and each of the ASC control codes and characters may be encoded via "0" and "1." On the receiving side, the relying party device 103 uses a built-in or a stand-alone LED light receiver 237 to capture the machine-transferrable one-time password code 203.

In various embodiments, the user device 101 renders the machine-transferrable one-time password code 203 as electrical or/and electromagnetic signals, such as Bluetooth, near field communications, radar, etc. via a Bluetooth transmitter 219, a near field communications transmitter 221, a radar transmitter 223, etc., respectively. On the receiving side, the relying party device 103 uses a built-in or a stand-alone Bluetooth receiver 239, a near field communications receiver 241, radar receiver 243, etc., respectively to capture the machine-transferrable one-time password code 203.

Figure 3:
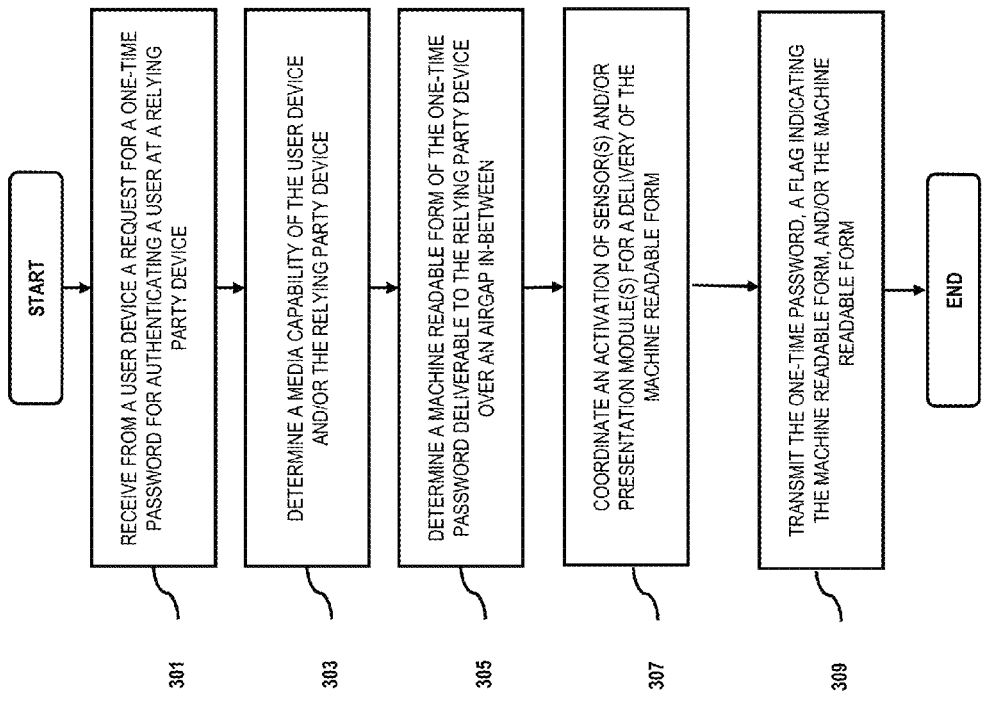
FIG. 3 is a flowchart of a process for authenticating and/or identifying a user through machine-transferrable one-time password codes, according to an exemplary embodiment.

FIG. 3 is a flowchart of a process for authenticating and/or identifying a user through machine-transferrable one-time password codes, according to an exemplary embodiment. By way of example, this authentication process is explained with respect to the authentication platform 119, user device 101, and the relying party device 103. Other authentication services can perform the functions of the authentication platform 119. Other devices, such as the mobile device 105, the information appliance device 107 (e.g., STB), the terminal 109 (e.g., point of sale, ATM, kiosk, etc.), etc. with an authentication module and one or more sensors can implement the functions of the user device 101 and/or the relying party device 103.

In step 301, the authentication platform 119 received from the user device 101 a request for a one-time password for authenticating a user at the relying party device 103. For example, the request may be prompted when a user attempts to log into a system (e.g., for accessing one or more services such as e-commerce, social networks, gaming, governmental or enterprise websites, etc.). In one embodiment, the request is initiated by the user specifying authentication credentials at the relying party device 103, and wherein the authentication credentials include a user identifier. In another embodiment, the user device is registered with the authentication system uses a user device identifier.

In one embodiment, the user device 101 is on an off-path channel. An "off-path" channel may be a secured channel within the same original path (e.g., a web browser and a text messaging system on the same physical phone device), or a physically distinct channel.

In step 303, the authentication platform 119 determines a media capability (e.g., augmented reality, flexible screens, built-in projector, voice control, 3D screens, holograms, etc.) of the user device 101, the relying party device 103, or a combination thereof.

In step 305, the authentication platform 119 determines a machine readable form of the one-time password, wherein the machine readable form is deliverable to the relying party device 103 over an air gap between the user device 101 associated with the user and the relying party device 103. In one embodiment, the determination of the machine readable form is further based on the media capability. In other embodiments, the determination of the machine readable form is further based on a user preference, a user selection, a user history, a service provider preference, an attribute of the air gap, or a combination thereof.

In other embodiments, the machine readable form is determined by the user at the user device 101, by the user at the relying party device 103, by the authentication platform 119, or a combination thereof. By way of examples, the machine readable form is determined when the user device 101 is registered with the authentication platform 119, when the user device identifier is submitted at the relying party device 103, or when the user device 101 receives the one-time password.

In various embodiments, the machine readable form includes one or more audio-based forms (e.g., one or more human audio clips, one or more human inaudible clips, one or more human audio tones, one or more human inaudible tones, etc.), one or more visual-based forms (e.g., human-readable text, one or more barcodes, one or more two-dimensional barcodes, one or more three-dimensional barcodes, one or more images, one or more photos, one or more video clips, one or more patterns for modulating light emitting modules of the user device, etc.), or a combination thereof; and wherein a delivery method of the machine readable form includes an audio presentation, a visual presentation, a transfer over local wireless means (e.g., NFC, Bluetooth, radar, etc.), or a combination thereof.

OTP generation algorithms typically make use of pseudo-randomness or randomness, to make it difficult to predict future OTPs by observing previous ones. Concrete OTP algorithms vary greatly in their details and each one has different benefits in terms of security, convenience, cost and accuracy. Such machine-transferrable one-time password code data may be generated with transaction number lists, grid cards, user information, etc. Typical user information elements include a user identifier (e.g., telephone number), nationality, age, language preferences, interest areas, user device model, login credentials (to access the listed information resources of external links), etc. An OTP token hardware device or smart card can be used to generate/calculate one-time passwords. The OTP token hardware device may be PIN-protected. Smart cards may include additional authentication capabilities such as Public Key Infrastructure certificates (PKI) that range from encryption, digital signature and private key generation and storage.

In step 307, the authentication platform 119 coordinates an activation of one or more sensors, one or more presentation modules, or a combination thereof for a delivery of the machine readable form from the user device 101 to the relying party device 103. In one embodiment, the coordination includes monitoring for one type of media before moving on to the next, such as iterating through the plurality of media formats. By way of example, in response to a passage of a predetermined time period or a change of one or more user selections, one or more user preferences, one or more user device capabilities, one or more relying party device capabilities, one or more air gap attributes, or a combination thereof, the authentication platform 119 re-determines transmitting the onetime password in another one of the plurality of media formats. In another embodiment, the coordination includes simultaneously testing the plurality of media formats.

In step 309, the authentication platform 119 transmits the one-time password, a flag indicating the machine readable form (as coded in Table 1), the machine readable form, or a combination thereof to the user device 101. In one embodiment, the user device 101 receives the one-time password and the flag, and the user device uses the one-time password as a seed to generate the machine readable form as indicated by the flag. The relying party device 103 receives the machine readable form via the air gap and then converts the machine readable form to the one-time password to authenticate the user.

TABLE 1

| | Flag parameter | | | | | | |
|---|---|---|---|---|---|---|---|
| | 1 | 2 | 3 | 4 | 5 | 6 | ... |
| attribute | Visual text | 3D holo- | LED array | NFC | Bluetooth | Non- human | ... |

TABLE 1-continued

| Flag parameter | | | | | | |
|---|---|---|---|---|---|---|
| 1 | 2 | 3 | 4 | 5 | 6 | ... |
| | graphic | pattern | | | audible sound | |

As mentioned, the above process has applicability in a number of applications that require authentication of the user. For example, this non-text based authentication process can be incorporated into the operating system of a computer. Also, this process can be utilized at point-of-sale terminals for users to conduct commercial transactions. According to another embodiment, user authentication can be deployed within an information appliance device (e.g., a set-top box) to, for example, verify the user's identity for purchasing on-demand content.

The above-described embodiments of authentication platform 119 include a repository and a processing system used to conform identity using factors/processes (static machine-transferrable OTP code features, the machine-transferrable OTP code occurring processes, transitions/interfaces in-between machine-transferrable one-time password codes, etc.) and combinations of factors/processes to determine identity with high probability. Moreover, platform 119 is capable of storing, processing, and managing authentication machine-transferrable OTP code records, imprints, sequences, and prompting for additional requests to further increase the accuracy of identification.

Figure 4:
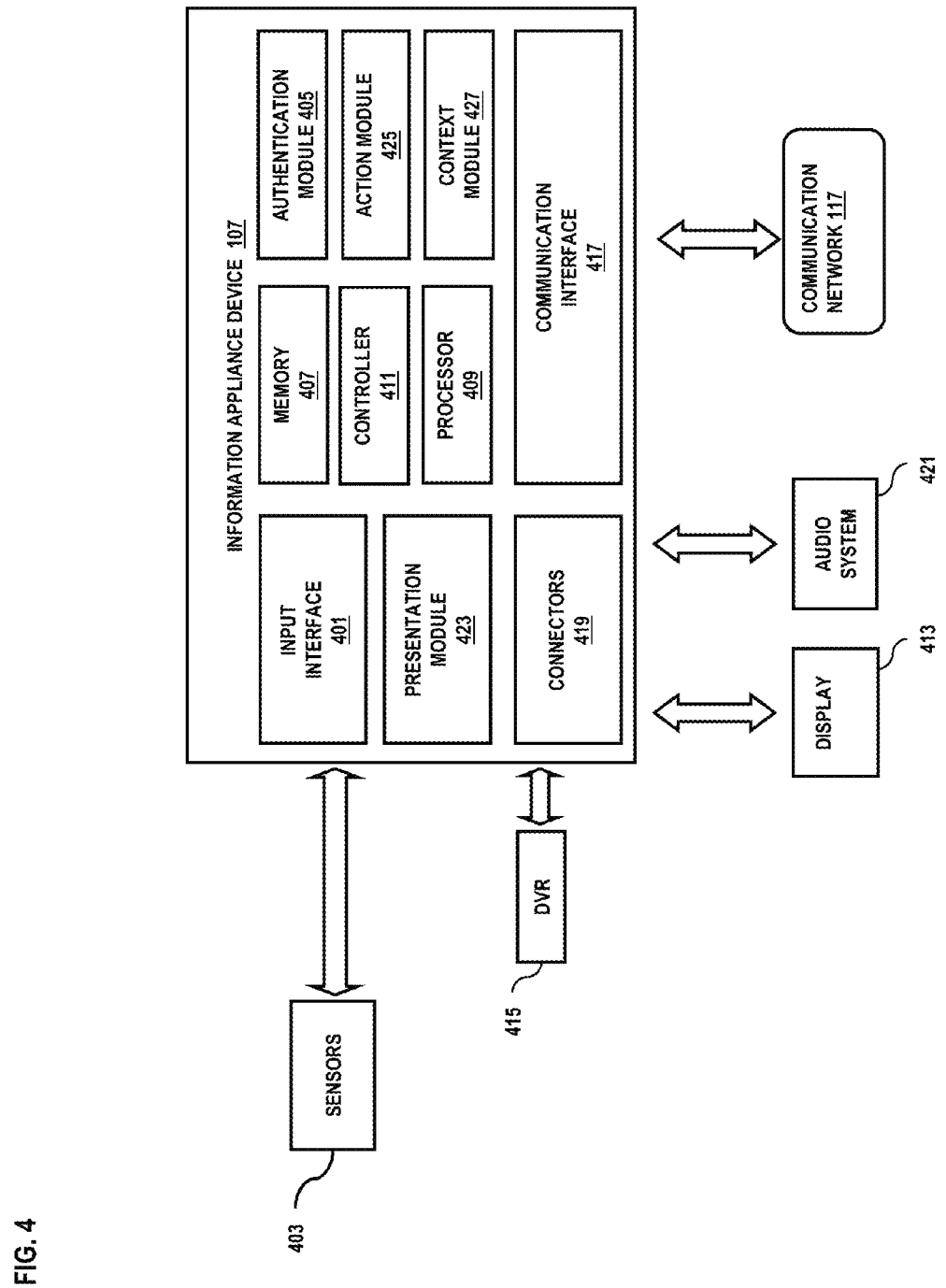
FIG. 4 is a diagram of an information appliance device configured to provide authentication and/or identification through machine-transferrable one-time password codes, according to an exemplary embodiment.

FIG. 4 is a diagram of an information appliance device configured to provide authentication and/or identification through machine-transferrable one-time password codes, according to an exemplary embodiment. The information appliance device 107 may function as the user device 101, or the authentication module 113, as needed.

The information appliance device 107 may comprise any suitable technology to send user profile information and associated authentication credentials to the platform 119, and receive a one-time password, a flag of machine-transferrable OTP code format, and/or a machine-transferrable one-time password code.

In this example, the information appliance device 107 includes an input interface 401 that also receives a machine-transferrable one-time password code transferred from the user device 101 via one or more sensors (e.g., a camera device, a microphone, etc.) 403. Also, an authentication module 405 resides within the information appliance device 107 to coordinate the authentication process with the authentication platform 119.

The information appliance device 107 also includes a memory 407 for storing the user profile information and associated authentication credentials, the captured machine-transferrable one-time password code (e.g., images, audio data, etc.) for converting the codes back to one-time passwords, as well as instructions that are performed by a processor 409. The machine-transferrable one-time password codes may include machine-transferrable one-time password codes, voice machine-transferrable one-time password code, machine-transferrable audio one-time password codes, or a combination thereof.

In some embodiments, either the authentication module 405, or an additional module of the information appliance device 107, or the authentication platform 119, or an additional module of the authentication platform 119 separately or jointly performs machine-transferrable one-time password code conversion and/or recognition. By way of example, the authentication module 405 converts one-time passwords into a 2D or 3D machine-transferrable visual one-time password code via processing the code using a conversion formula or model, and displaying the code on a built-in screen. The conversion formula or model can be used to convert the one-time password into different machine-transferrable visual one-time password codes.

As another example, the authentication module 405 uses a camera to capture a machine-transferrable visual one-time password code and reverts the code back to a one-time password, via processing the visual information from the camera, identifying the key regions and elements (such as colors, shapes, sizes, etc.), transforming the 2D information into 3D spatial data as necessary, applying the 2D information or 3D spatial data to a reverting model (e.g., an avatar, mountain, etc.). The reverting model can be used to revert the machine-transferrable visual one-time password code back to the one-time password. In another embodiment, the information appliance device 107 determines error tolerance, so as to reach desired recognition accuracy.

In one embodiment, the information appliance device 107 adopts the models to define a sequence of machine-transferrable one-time password codes as an n-dimensional vector that combines format information, the timing information, and the relevant user information. In another embodiment, the information appliance device 107 also establishes a user (e.g., Alice), service (e.g., purchasing movie tickets), and machine-transferrable one-time password code from (e.g., 2D bar code) database. Such databases can be utilize by information appliance device 107, the platform 119, the user device 101, and/or the relying party device 103 to determine subsequent machine-transferrable one-time password code forms for the user and/or the service.

In other embodiments, different forms of machine-transferrable one-time password codes are deployed together and/or in conjunction with traditional authentication means to strengthen the authentication and/or identification. By way of example, the information appliance device 107 measures a person's physiological state and/or conditions (e.g., a heart rate, fingerprints, etc.) when performing various machine-transferrable visual one-time password codes (e.g., 2D image of a one-time password, etc.). The information appliance device 107 then utilizes both sets of data for authentication and/or identification. As another example, the information appliance device 107 collects sounds generated by the speaker of the user device 101 when capturing various machine-transferrable visual one-time password codes (e.g., 3D images of encrypted one-time password), and then uses both sets of data for authentication and/or identification.

In the above-mentioned embodiments, the information appliance device 107 analyzes the plurality of data sets to determine one or more features of each of the machine-transferrable one-time password codes, one or more features of the sequence of machine-transferrable one-time password codes, or a combination thereof. The information appliance device 107 then reverts the code(s) back to a one-time password based on the features of the machine-transferrable one-time password code, the features of the sequence of machine-transferrable one-time password codes, or a combination thereof. The features include content information, timing information, ranging information, or a combination thereof. The timing information includes a start time, a stop time, an overlapping period, an interval, or a combination thereof, of the sequence of machine-transferrable one-time password codes. In one embodiment, the information appliance device 107 compares the features associated with the sequence of machine-transferrable one-time password codes against features of one or more pre-stored sequences. The reversion of the one-time password is based on the comparison.

Further, the information appliance device 107 (e.g., a STB) may also include suitable technology to receive one or more content streams from a media source (not shown). The information appliance device 107 may comprise computing hardware and include additional components configured to provide specialized services related to the generation, modification, transmission, reception, and display of one-time passwords, machine-transferrable one-time password codes, profiles, control commands, and/or content (e.g., user profile modification capabilities, conditional access functions, tuning functions, gaming functions, presentation functions, multiple network interfaces, AV signal ports, etc.). Alternatively, the functions and operations of the information appliance device 107 may be governed by a controller 411 that interacts with each of the information appliance device components to configure and modify user profiles including machine-transferrable one-time password code form preference.

The information appliance device 107 may be configured to process machine-transferrable one-time password codes to be presented on (or at) a display 413. Presentation of the machine-transferrable one-time password codes may be in response to a command received from input interface 401. The information appliance device 107 still performs functions: displaying, recording, playing, rewinding, forwarding, toggling, selecting, zooming, or any other processing technique that enables users to select customized content instances from a menu of options and/or experience content.

The information appliance device 107 may also interact with a digital video recorder (DVR) 415, to store captured machine-transferrable one-time password codes that can be manipulated by a user at a later point in time. In various embodiments, DVR 415 may be network-based, e.g., included as a part of the service provider network 125, collocated at a subscriber site having connectivity to the information appliance device 107, and/or integrated into the information appliance device 107.

Display 413 may present menus and associated content provided via the information appliance device 107 to a user. In alternative embodiments, the information appliance device 107 may be configured to communicate with a number of additional peripheral devices, including: PCs, laptops, PDAs, cellular phones, monitors, mobile devices, handheld devices, as well as any other equivalent technology capable of presenting modified content to a user, such as those computing, telephony, and mobile apparatuses described with respect to FIG. 1.

Communication interface 417 may be configured to send user profile information from the authentication platform 119, and to receive a one-time password from the platform 119. In particular embodiments, communication interface 417 can be configured to receive content and applications (e.g., online games) from an external server (not shown). As such, communication interface 417 may optionally include single or multiple port interfaces. For example, the information appliance device 107 may establish a broadband connection to multiple sources transmitting data to the information appliance device 107 via a single port, whereas in alternative embodiments, multiple ports may be assigned to the one or more sources. In still other embodiments, communication interface 417 may receive and/or transmit user profile information (including modified content menu options, and/or modified content scheduling data).

According to various embodiments, the information appliance device 107 may also include inputs/outputs (e.g., connectors 419) to display 413 and DVR 415, as well as an audio system 421. In particular, audio system 421 may comprise a conventional AV receiver capable of monaural or stereo sound, as well as multichannel surround sound. Audio system 421 may include speakers, ear buds, headphones, or any other suitable component configured for personal or public dissemination. As such, the information appliance device 107 (e.g., a STB), display 413, DVR 415, and audio system 421, for example, may support high resolution audio and/or video streams, such as high definition television (HDTV) or digital theater systems high definition (DTS-HD) audio, for rendering machine-transferrable one-time password codes.

In an exemplary embodiment, display 413 and/or audio system 421 may be configured with internet protocol (IP) capability (i.e., include an IP stack, or otherwise made network addressable), such that the functions of the information appliance device 107 may be assumed by display 413 and/or audio system 421 and controlled, in part, by command(s) associated with machine-transferrable one-time password codes. In this manner, an IP ready, HDTV display or DTS-HD audio system may be directly connected to one or more service provider networks 125, packet-based networks 131, and/or telephony networks 133. Although the information appliance device 107, display 413, DVR 415, and audio system 421 are shown separately, it is contemplated that these components may be integrated into a single component, or other combinations of components.

An authentication module 405, in addition to supporting the described OTP-based authentication scheme, may be provided at the information appliance device 107 to initiate or respond to authentication schemes of, for instance, service provider network 125 or various other content providers, e.g., broadcast television systems, third-party content provider systems (not shown). Authentication module 405 may provide sufficient authentication information, e.g., machine-transferrable one-time password codes, a user name and passcode, a key access number, a unique machine identifier (e.g., GUID or MAC address), and the like, as well as combinations thereof, to a corresponding network interface for establishing connectivity and/or user authentication. Further, authentication information may be stored locally at memory 407, in a repository (not shown) connected to the information appliance device 107, or at a remote repository, e.g., database 121 of FIG. 1.

A presentation module 423 may be configured to receive data streams and AV feeds and/or control commands (including user actions), and output a result via one or more connectors 419 to display 413 and/or audio system 421. Connector(s) 419 may provide various physical interfaces to display 413, audio system 421, and the peripheral apparatuses; the physical interfaces including, for example, RJ45, RJ11, high definition multimedia interface (HDMI), optical, coax, FireWire, wireless, and universal serial bus (USB), or any other suitable connector.

The presentation module 423 may also interact with input interface 401 for configuring (e.g., modifying) user profiles, as well as determining particular machine-transferrable one-time password codes that a user desires to use. In an exemplary embodiment, the input interface 401 may provide an interface to a remote control (or other access device having control capability, such as a joystick, video game controller, or an end terminal, e.g., a PC, wireless device, mobile phone, etc.) that provides a user with the ability to readily manipulate and dynamically modify parameters affecting user profile information and/or machine-transferrable one-time password codes. Such parameters can include the information appliance device 107 configuration data, such as parental controls, available channel information, favorite channels, program recording settings, viewing history, machine-transferrable one-time password code forms, or loaded software, as well as other suitable parameters.

An action module 425 may be configured to determine one or more actions to take based upon the authenticating results from the authentication module 405. Such actions may be determined based upon resource access policies (e.g., privacy policy, security policy, etc.), for granting access to one or more resources, and one or more action commands may be output via one or more connectors 419 to display 413 and/or audio system 421, or via the communication interface 417 and the communication network 117 to external entities. The resource may be an electronic object (e.g., data, a database, a software application, a website, an account, a game, a virtual location, etc.), or a real-life object (e.g., a safe, a mail box, a deposit box, a locker, a device, a machine, a piece of equipment, etc.). In one embodiment, the policies may be initially selected by a user (e.g., a bank manager) at a user device (e.g., a secured computer) to ensure that collected data will only be utilized in certain ways or for particular purposes (e.g., authorized user access to the user's account information).

In one embodiment, the policy characteristics may include the access request context (e.g., data type, requesting time, requesting frequency, etc.), whether the contexts are permitted by the respective policies, the details of a potential/actual validation of the access requests, etc. By way of example, the data type may be a name, address, date of birth, marital status, contact information, ID issue and expiry date, financial records, credit information, medical history, travel location, interests in acquiring goods and services, etc., while the policies may define how data may be collected, stored, and released/shared (which may be on a per data type basis).

In the above-mentioned embodiments, the information appliance device 107 and/or the platform 119 determine one or more access policies for at least one resource, applies one or more of the access policies based, at least in part, upon the authentication of the user, and causes, at least in part, operation of at least one action with respect to the at least one resource based upon the applied one or more access policies.

A context module 427 may be configured to determine context and/or context tokens of the user's authentication. The user context includes context characteristics/data of a user and/or the user device, such as a date, time, location, current activity, weather, a history of activities, etc. associated with the user, and optionally, user preferences. The context module 427 selects among the features of each of the machine-transferrable one-time password codes, the features of the sequence of machine-transferrable one-time password codes, or a combination thereof for authenticating the user, based, at least in part, on the context, context tokens, machine-transferrable one-time password codes, the applied one or more access policies, or a combination thereof. As mentioned, the context tokens associated with a person may be a birthday, health, moods, clothes, etc. of the person. The context tokens associated with an activity element may be the time, location, equipment, materials, etc. of the activity. The context tokens associated with an object of interest may be a color, size, price, position, quality, quantity, etc. of the object.

According to certain embodiments, the camera device 403 can interact with the display 413 to transfer one or more machine-transferrable one-time password codes via an air gap. Further, input interface 401 may comprise a memory (not illustrated) for storing preferences (or user profile information) affecting the machine-transferrable one-time password codes, which can be conveyed to the information appliance device 107. Input interface 401 may support any type of wired and/or wireless link, e.g., infrared, radio frequency (RF), BLUETOOTH, and the like. Input interface 401, communication interface 417, and/or control device 403 may further comprise automatic speech recognition (ASR) and/or text-to-speech (TTS) technology for effectuating voice recognition functionality.

It is noted that the described authentication process, according to certain embodiments, can be provided as a managed service via service provider network 125.

Figure 5B:
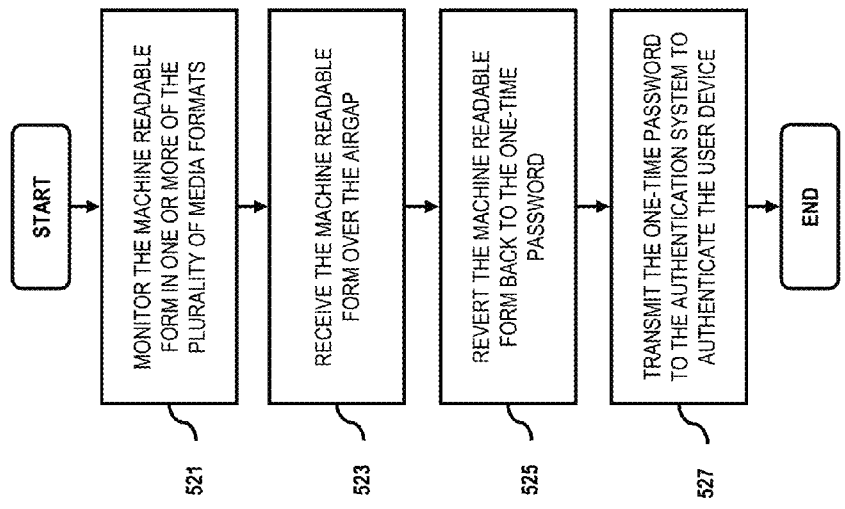
FIG. 5B a flowchart of a process for capturing one or more machine-transferrable one-time password codes, according to an exemplary embodiment.
Figure 5A:
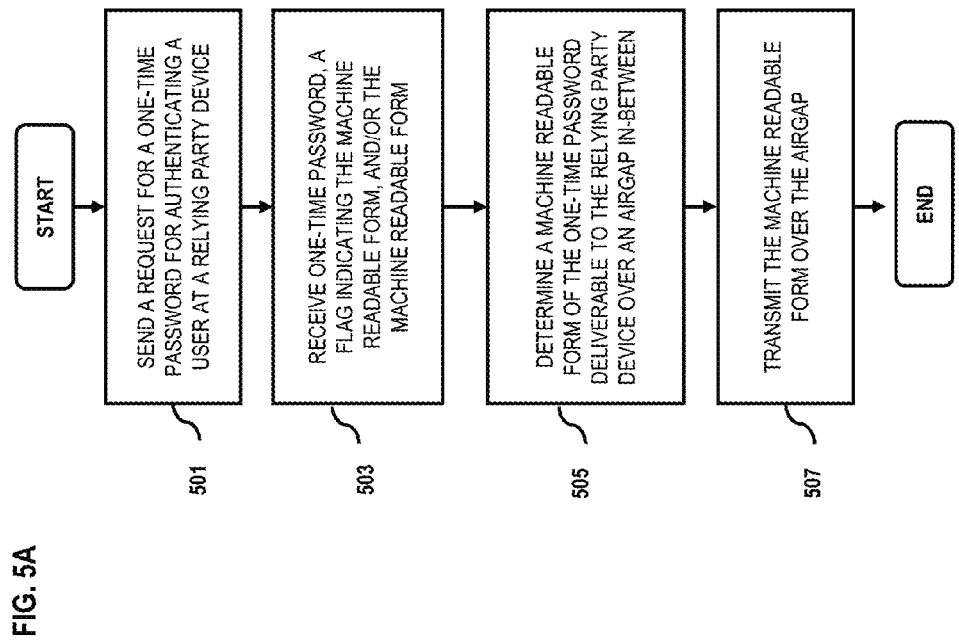
FIG. 5A is a flowchart of a process for providing one or more machine-transferrable one-time password codes, according to an exemplary embodiment.

FIG. 5A is a flowchart of a process for providing one or more machine-transferrable one-time password codes, according to an exemplary embodiment. In step 501, the user device 101 sends a request (e.g., to the platform 119) for a one-time password for authenticating a user at the relying party device 103. In step 503, the user device 101 receives a one-time password, a flag indicating the machine readable form, and/or the machine readable form.

In step 505, the user device 101 determines a machine readable form of the one-time password deliverable to the relying party device over an air gap in-between. By way of example, the user chooses to convert one or more one-time passwords into one or more machine-transferrable one-time password code forms in series, in parallel, or both. In step 507, the user device 101 transmits the machine readable form over the air gap.

FIG. 5B a flowchart of a process for capturing one or more machine-transferrable one-time password codes, according to an exemplary embodiment. In step 521, the relying party device 103 monitors the machine readable form in one or more of the plurality of media formats. In step 523, the relying party device 103 receives the machine readable form over the air gap. In step 525, the relying party device 103 reverts the machine readable form back to the one-time password. In step 527, the relying party device 103 transmits the one-time password to the authentication system to authenticate the user device 101. As such, one-time passwords are received by the authentication platform 119 from the user, and the machine readable OTP form is stored within the user profile database 121 in conjunction with the access services/resources.

Subsequently, an application or process requests the machine-transferrable OTP code forms or a sequence of machine-transferrable one-time password code forms for a particular user from the authentication platform 119. For instance, the application can be executed by a point-of-sale terminal 109 upon a user attempting to make a purchase. The platform 119 examines the request and extracts a user ID and locates the machine-transferrable one-time password code form(s) for the specified user from the database 121. Next, the authentication platform 119 sends the retrieved machine-transferrable one-time password code forms to the requesting terminal 109. Thereafter, the terminal 109 can authenticate the user based on the machine-transferrable one-time password code forms supplied from the authentication platform 119.

In addition to or in the alternative, the authentication process itself can be performed by the platform 119. Under this scenario, the terminal 109 does not perform the verification of the user itself, but merely supplies the machine-transferrable one-time password codes to the platform 119. As seen in FIG. 3, the platform 119 receives an authentication request, which may include the user specified machine-transferrable one-time password code form(s) and recognition information for the user. The platform 119 then retrieves the stored machine-transferrable one-time password code forms for the particular user in database 121.

On presenting the screen by the user device 101, the relying party device 103 can activate its camera (e.g., a front-facing camera) to begin capturing images associated with machine-transferrable one-time password code for analysis.

In various embodiments, image markers are calculated locally at the relying party device 103 and/or sent to the authentication platform 119 for comparison or analysis. It is contemplated that the image markers can be based on any feature identified in the images. As noted above, the user may submit a sequence of machine-transferrable one-time password codes that only the user knows.

Figure 6B:
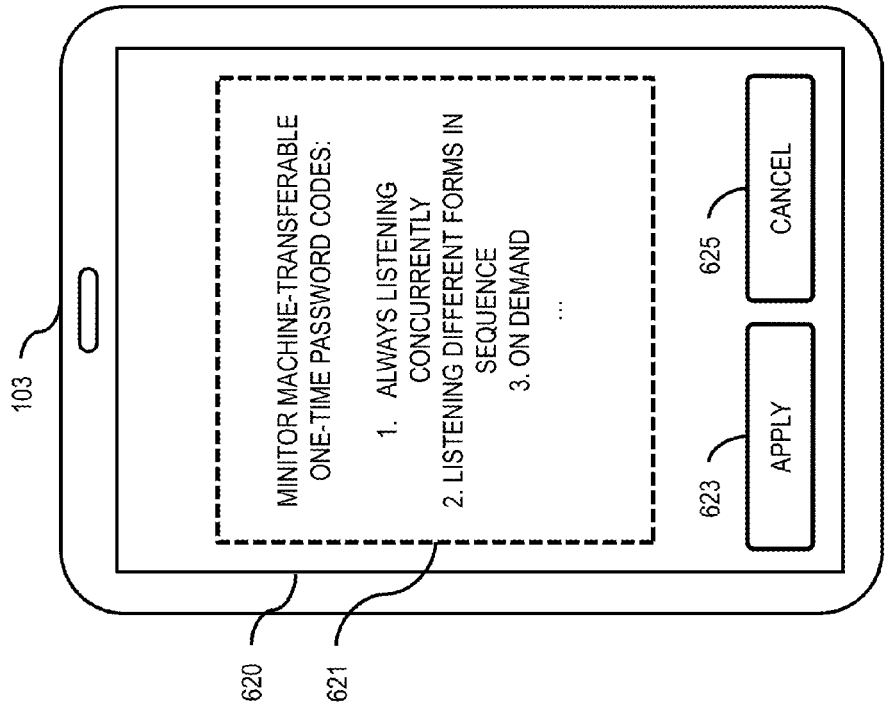
FIGS. 6A and 6B are diagrams of user interfaces utilized in the processes of FIGS. 5A-5B, according to various embodiments.
Figure 6A:
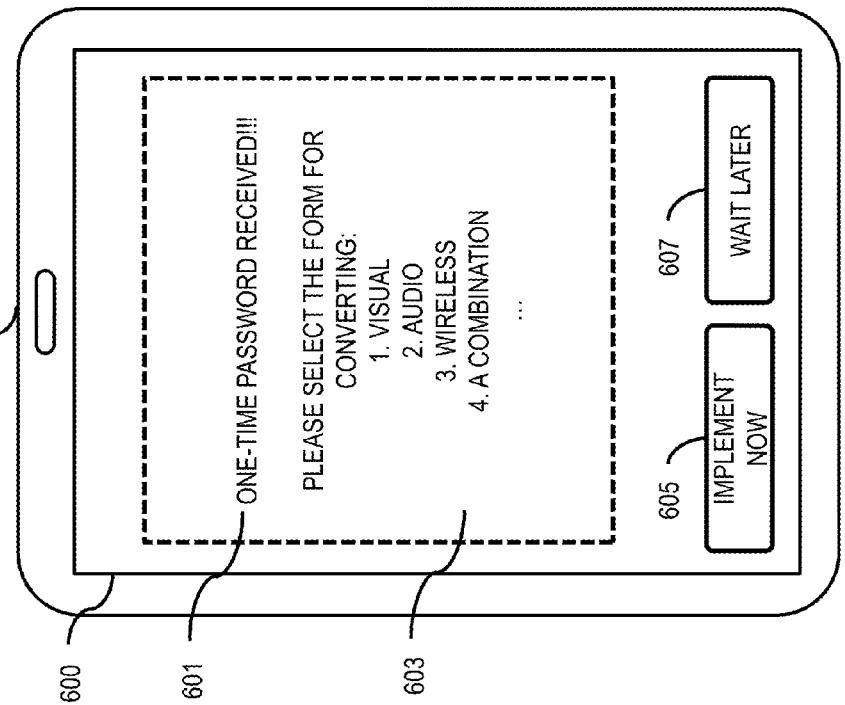

FIGS. 6A and 6B are diagrams of user interfaces utilized in the processes of FIGS. 5A and 5B, according to various embodiments. FIG. 6A features the user device 101 utilizing a user interface 600, which illustrates a notification/alert 601 as well as options 603. As shown, the user is presented with the notification 601 of "ONE-TIME PASSWORD RECEIVED!!!" and options 603 to select the form of conversion: 1. Visual, 2. Audio, 3. Wireless, 4, a Combination, etc. If the user selects one the options 603 (e.g., "Wireless"), the user may further select: 1. NFC, 2. Bluetooth, 3. Radar, etc. If the user selects one the options 603 (e.g., "a Combination"), the user may further select: 1. "1+2," 2. "1+3", etc.

The user may further select the tap "Implement Now" 605 or the tap "Wait Later" 607 to modify the selection right away or later. The system 100 may then adapt and execute the one-time password conversion accordingly.

FIG. 6B features the relying party device 103 utilizing a user interface 620, which illustrates machine-transferrable one-time password codes monitoring modes 621: (1) Always scan/monitor for all forms concurrently, (2) scan/monitor for different forms in sequence, (3) scan/monitor for one or more forms on demand, etc. The user can switch between the modes at any time by selecting the tap "Apply" 623 or the tap "Cancel" 625.

The processes described herein for authenticating via machine-transferrable one-time password codes may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

The above-described embodiments support simple ad-hoc air gap transfers, and add security protection to the OTP in local transit. Via the machine readable code forms, the above-described embodiments reduce or eliminate human data entry errors. In addition, the above-described embodiments provide local second factor hashing capability.

Figure 7:
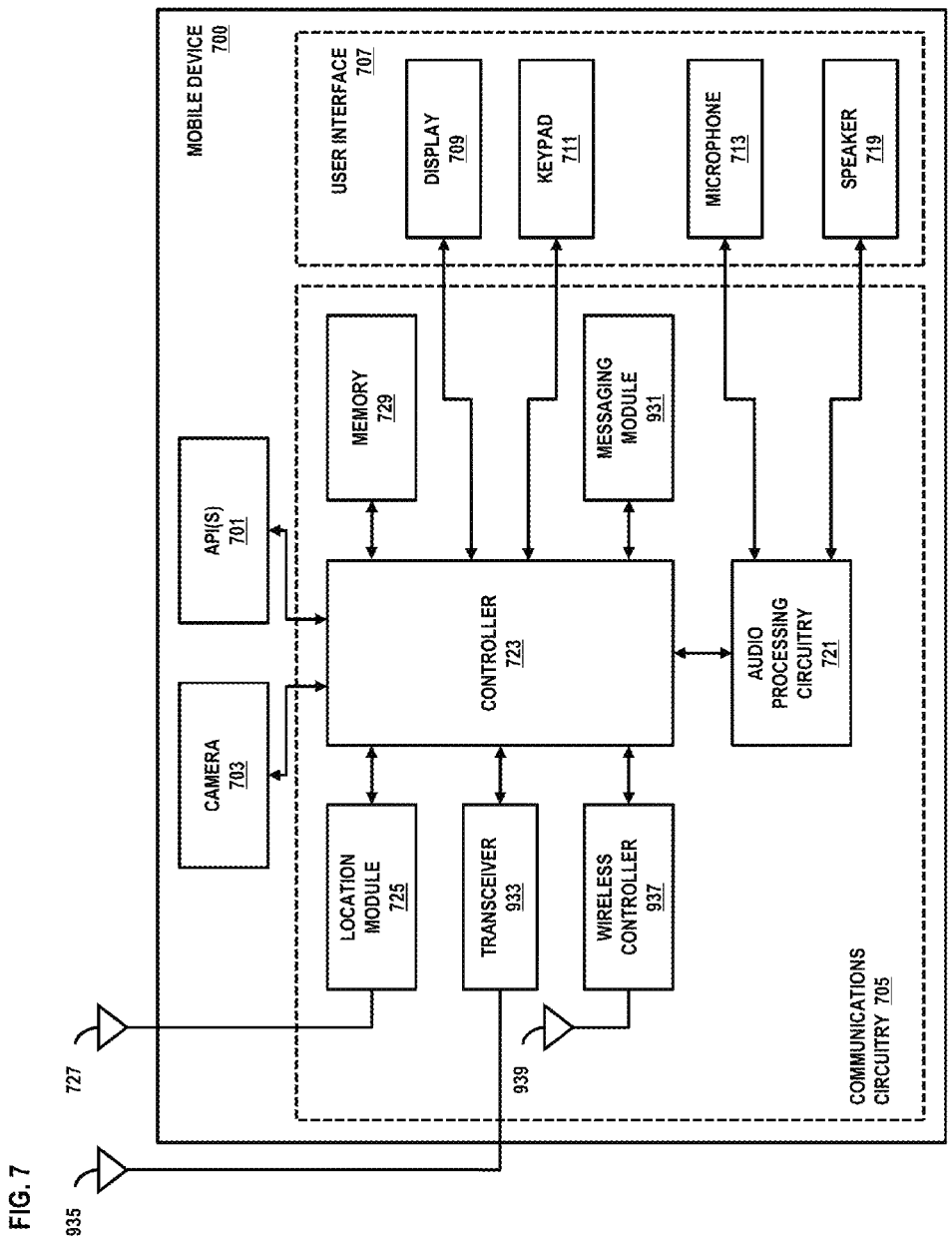
FIG. 7 is a diagram of a mobile device configured to authenticate and/or identify a user, according to an exemplary embodiment.

FIG. 7 is a diagram of a mobile device configured to authenticate and/or identify a user, according to an exemplary embodiment. Mobile device 700 may comprise computing hardware (such as described with respect to FIG. 8), as well as include one or more components configured to execute the processes described herein for user authentication and/or identification over a network from or through the mobile device 700. In this example, mobile device 700 includes application programming interface(s) 701, camera 703, communications circuitry 705, and user interface 707. While specific reference will be made hereto, it is contemplated that mobile device 700 may embody many forms and include multiple and/or alternative components.

According to exemplary embodiments, user interface 705 may include one or more displays 709, keypads 711, microphones 713, and/or speakers 715. Display 709 provides a graphical user interface (GUI) that permits a user of mobile device 700 to view dialed digits, call status, menu options, and other service information. The GUI may include icons and menus, as well as other text and symbols. Keypad 709 includes an alphanumeric keypad and may represent other input controls, such as one or more button controls, dials, joysticks, touch panels, etc. The user thus can construct customer profiles, enter commands, initialize applications, input remote addresses, select options from menu systems, and the like. Microphone 711 coverts spoken utterances of a user (or other auditory sounds, e.g., environmental sounds) into electronic audio signals, whereas speaker 719 converts audio signals into audible sounds.

Communications circuitry 705 may include audio processing circuitry 721, controller 723, location module 725 (such as a GPS receiver) coupled to antenna 727, memory 729, messaging module 731, transceiver 733 coupled to antenna 735, and wireless controller 737 coupled to antenna 739. Memory 729 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 729 may be implemented as one or more discrete devices, stacked devices, or integrated with controller 723. Memory 729 may store information, such as one or more customer profiles, one or more user defined policies, one or more contact lists, personal information, sensitive information, work related information, etc.

Additionally, it is contemplated that mobile device 700 may also include one or more applications and, thereby, may store (via memory 729) data associated with these applications for providing users with browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, control signals received by mobile device 700 from, for example, network 117 may be utilized by API(s) 701 and/or controller 723 to facilitate remotely configuring, modifying, and/or utilizing one or more features, options, settings, etc., of these applications. It is also contemplated that these (or other) control signals may be utilized by controller 723 to facilitate remotely backing up and/or erasing data associated with these applications. In other instances, the control signals may cause mobile device 700 to become completely or partially deactivated or otherwise inoperable.

Accordingly, controller 723 controls the operation of mobile station 700, such as in response to commands received from API(s) 701 and/or data stored to memory 729. Control functions may be implemented in a single controller or via multiple controllers. Suitable controllers 723 may include, for example, both general purpose and special purpose controllers and digital signal processors. Controller 723 may interface with audio processing circuitry 721, which provides basic analog output signals to speaker 719 and receives analog audio inputs from microphone 713. In exemplary embodiments, controller 723 may be controlled by API(s) 701 in order to capture signals from camera 703 or microphone 713 in response to control signals received from network 117. In other instances, controller 723 may be controlled by API(s)

701 to cause location module 725 to determine spatial positioning information corresponding to a location of mobile device 700. Still further, controller 723 may be controlled by API(s) 701 to image (e.g., backup) and/or erase memory 729, to configure (or reconfigure) functions of mobile device 700, to track and generate device usage logs, or to terminate services available to mobile device 700. It is noted that captured signals, device usage logs, memory images, spatial positioning information, and the like, may be transmitted to network 117 via transceiver 733 and/or wireless controller 737. In this manner, the captured signals and/or other forms of information may be presented to users and stored to one or more networked storage locations, such as customer profiles repository (not shown), or any other suitable storage location or memory of (or accessible to) the components and facilities of system 100.

It is noted that real time spatial positioning information may be obtained or determined via location module 725 using, for instance, satellite positioning system technology, such as GPS technology. In this way, location module 725 can behave as (or substantially similar to) a GPS receiver. Thus, mobile device 700 employs location module 725 to communicate with constellation of satellites. These satellites transmit very low power interference and jamming resistant signals received by GPS receivers 725 via, for example, antennas 727. At any point on Earth, GPS receiver 725 can receive signals from multiple satellites, such as six to eleven. Specifically, GPS receiver 725 may determine three-dimensional geographic location (or spatial positioning information) from signals obtained from at least four satellites. Measurements from strategically positioned satellite tracking and monitoring stations are incorporated into orbital models for each satellite to compute precise orbital or clock data. Accordingly, GPS signals may be transmitted over two spread spectrum microwave carrier signals that can be shared by GPS satellites. Thus, if mobile device 700 is able to identify signals from at least four satellites, receivers 725 may decode the ephemeris and clock data, determine the pseudo range for each satellite and, thereby, compute the spatial positioning of a receiving antenna 727. With GPS technology, mobile device 700 can determine its spatial position with great accuracy and convenience. It is contemplated, however, that location module 725 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time of difference (E-OTD), enhanced forward link trilateration (EFLT), network multipath analysis, and the like.

Mobile device 700 also includes messaging module 731 that is configured to receive, transmit, and/or process messages (e.g., EMS messages, SMS messages, MMS messages, IM messages, electronic mail messages, and/or any other suitable message) received from (or transmitted to) network 117 or any other suitable component or facility of system 100. As previously mentioned, network 117 may transmit control singles to mobile device 700 in the form of one or more API 701 directed messages, e.g., one or more BREW directed SMS messages. As such, messaging module 731 may be configured to identify such messages, as well as activate API(s) 701, in response thereto. Furthermore, messaging module 731 may be further configured to parse control signals from these messages and, thereby, port parsed control signals to corresponding components of mobile device 700, such as API(s) 701, controller 723, location module 725, memory 729, transceiver 733, wireless controller 737, etc., for implementation.

According to exemplary embodiments, API(s) 701 (once activated) is configured to effectuate the implementation of the control signals received from network. It is noted that the control signals are utilized by API(s) 701 to, for instance, remotely control, configure, monitor, track, and/or capture signals from (or related to) camera 703, communications circuitry 705, and/or user interface 707. In this manner, visual and/or acoustic indicia pertaining to an environment surrounding mobile device 700 may captured by API(s) 701 controlling camera 703 and microphone 713. Other control signals to cause mobile device 700 to determine spatial positioning information, to image and/or erase memory 729, to configure (or reconfigure) functions, to track and generate device usage logs, or to terminate services, may also be carried out via API(s) 701. As such, one or more signals captured from camera 703 or microphone 713, or device usage logs, memory images, spatial positioning information, etc., may be transmitted to network 117 via transceiver 733 and/or wireless controller 737, in response to corresponding control signals provided to transceiver 733 and/or wireless controller 737 by API(s) 701. Thus, captured signals and/or one or more other forms of information provided to network 117 may be presented to users and/or stored to one or more of customer profiles repository (not shown), or any other suitable storage location or memory of (or accessible to) the components and facilities of system 100.

It is also noted that mobile device 700 can be equipped with wireless controller 737 to communicate with a wireless headset (not shown) or other wireless network. The headset can employ any number of standard radio technologies to communicate with wireless controller 737; for example, the headset can be BLUETOOTH enabled. It is contemplated that other equivalent short range radio technology and protocols can be utilized. While mobile device 700 has been described in accordance with the depicted embodiment of FIG. 7, it is contemplated that mobile device 700 may embody many forms and include multiple and/or alternative components.

The described processes and arrangement advantageously enables user authentication and/or identification over a network. The processes described herein for user authentication and/or identification may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
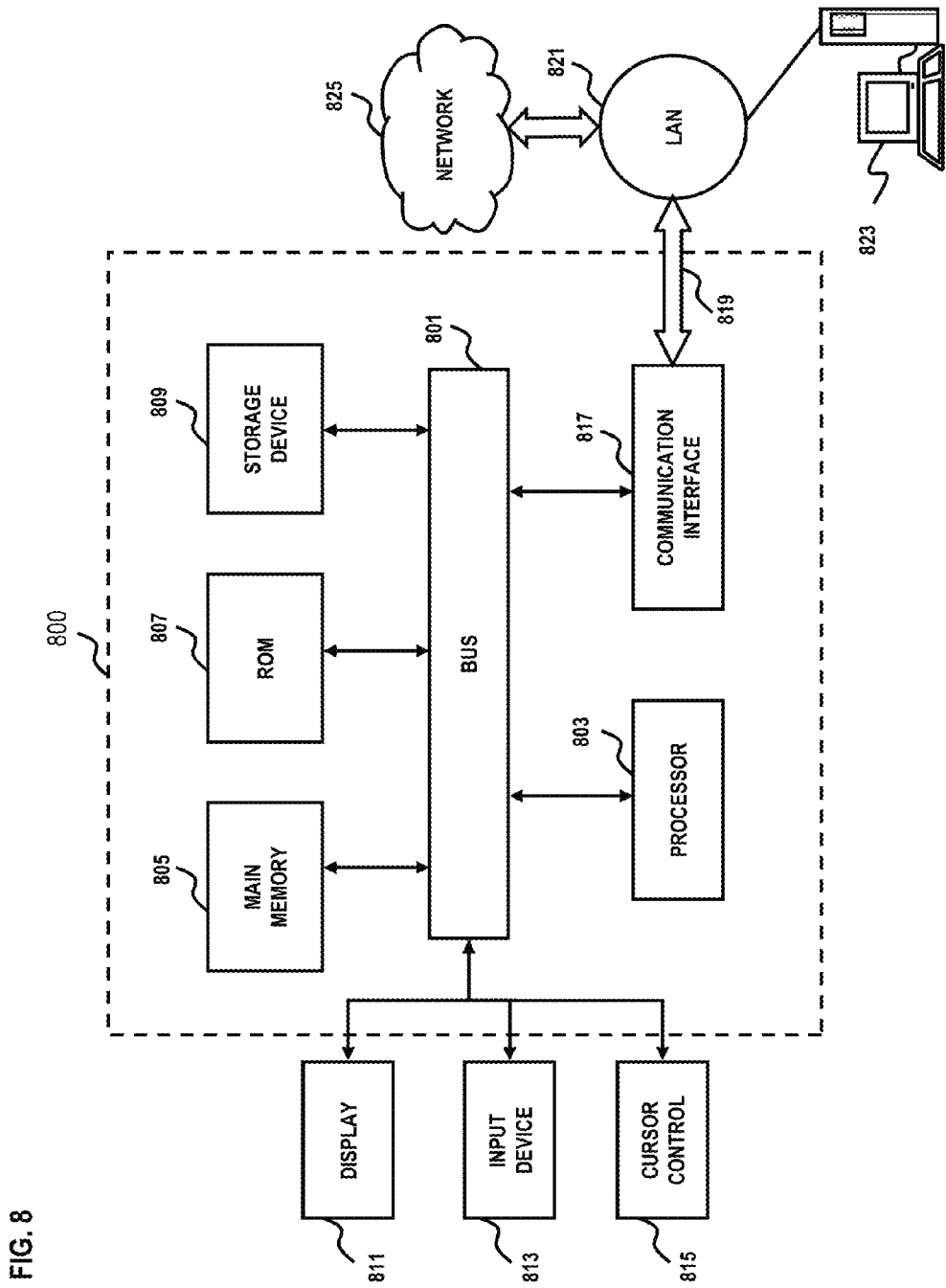
FIG. 8 is a diagram of a computer system that can be used to implement various exemplary embodiments.

FIG. 8 illustrates computing hardware (e.g., a computer system) upon which an embodiment according to the invention can be implemented to authenticate and/or identify a user over a network. The computer system 800 includes a bus 801 or other communication mechanism for communicating information and a processor 803 coupled to the bus 801 for processing information. The computer system 800 also includes a main memory 805, such as random access memory (RAM) or other dynamic storage device, coupled to the bus 801 for storing information and instructions to be executed by the processor 803. The main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in the main memory 805. Such instructions can be read into the main memory 805 from another computer-readable medium, such as the storage device 809. Execution of the arrangement of instructions contained in the main memory 805 causes the processor 803 to perform the process steps described herein. One or more processors in a multi-processing arrangement may also be employed to execute the instructions contained in the main memory 805. In alternative embodiments, hard-wired circuitry may be used in place of or in combination with software instructions to implement the embodiment of the invention. Thus, embodiments of the invention are not limited to any specific combination of hardware circuitry and software.

Figure 9:
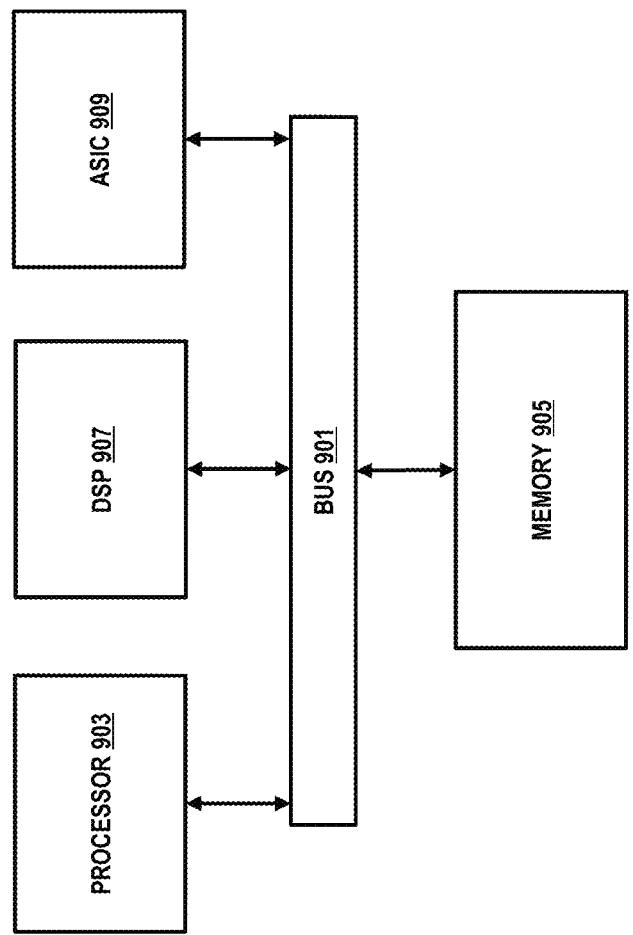
FIG. 9 is a diagram of a chip set that can be used to implement various exemplary embodiments.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, the communication interface 817 may be a local area network (LAN) card (e.g. For Ethernet™ or an Asynchronous Transfer Mode (ATM) network) to provide a data communication connection to a compatible LAN. Wireless links can also be implemented. In any such implementation, the communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 9, multiple communication interfaces can also be employed.

The network link 819 typically provides data communication through one or more networks to other data devices. For example, the network link 819 may provide a connection through a local network 821 to a host computer 823, which has connectivity to a network 825 (e.g. A wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as the main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 9 illustrates a chip set 900 upon which an embodiment of the invention may be implemented. The chip set 900 is programmed to authenticate and/or identify a user as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. The chip set 900, or a portion thereof, constitutes a means for performing one or more steps of FIGS. 3 and 5.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set top box based on device events. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving at an authentication server a request for a one-time password for authenticating a user at a relying party device;
   determining by the authentication server a machine readable form of the one-time password, wherein the machine readable form is deliverable from a user device associated with the user to the relying party device over an air gap between the user device and the relying party device; and
   transmitting by the authentication server the one-time password and a flag indicating the machine readable form to the user device, causing the user device to use the one-time password as a seed to generate the machine readable form.

2. A method of claim 1, wherein the user device receives the one-time password and the flag, and wherein the user device uses the one-time password to generate the machine readable form as indicated by the flag.

3. A method of claim 1, further comprising:
   determining a media capability of the user device, the relying party device, or a combination thereof,
   wherein the determination of the machine readable form is further based on the media capability.

4. A method of claim 1, further comprising:
   coordinating an activation of one or more sensors, one or more presentation modules, or a combination thereof for a delivery of the machine readable form from the user device to the relying party device.

5. A method of claim 4, wherein the relying party device converts the machine readable form to the one-time password to authenticate the user.

6. A method of claim 1, wherein the determination of the machine readable form is further based on a user preference, a user selection, a user history, a service provider preference, an attribute of the air gap, or a combination thereof.

7. A method of claim 1, wherein the request is initiated by the user specifying authentication credentials at the relying party device, and wherein the authentication credentials include a user identifier.

8. A method of claim 1, wherein the machine readable form includes one or more audio-based forms, one or more visual-based forms, or a combination thereof; and wherein a delivery method of the machine readable from includes an audio presentation, a visual presentation, a transfer over local wireless means, or a combination thereof.

9. A method of claim 1, wherein the user device is on an off-path channel, and the machine readable form is delivered from the user device via the air gap to the relying party device without user intervention.

10. An apparatus comprising a processor configured to:
    receive a request for a one-time password for authenticating a user at a relying party device;
    determine a machine readable form of the one-time password, wherein the machine readable form is deliverable from a user device associated with the user to the relying party device over an air gap between the user device and the relying party device; and
    transmit the one-time password and a flag indicating the machine readable form to the user device, causing the user device to use the one-time password as a seed to generate the machine readable form.

11. An apparatus of claim 10, wherein the user device receives the one-time password and the flag, and wherein the user device uses the one-time password to generate the machine readable form as indicated by the flag.

12. An apparatus of claim 10, wherein the processor is further configured to:
    determine a media capability of the user device, the relying party device, or a combination thereof,
    wherein the determination of the machine readable form is further based on the media capability.

13. An apparatus of claim 10, wherein the processor is further configured to:
    coordinate an activation of one or more sensors, one or more presentation modules, or a combination thereof for a delivery of the machine readable form from the user device to the relying party device.

14. An apparatus of claim 13, wherein the relying party device converts the machine readable form to the one-time password to authenticate the user.

15. An apparatus of claim 10, wherein the determination of the machine readable form is further based on a user preference, a user selection, a user history, a service provider preference, an attribute of the air gap, or a combination thereof.

16. An apparatus of claim 10, wherein the request is initiated by the user specifying authentication credentials at the relying party device, and wherein the authentication credentials include a user identifier.

17. An apparatus of claim 10, wherein the machine readable form includes one or more audio-based forms, one or more visual-based forms, or a combination thereof; and wherein a delivery method of the machine readable from includes an audio presentation, a visual presentation, a transfer over local wireless means, or a combination thereof.

18. An apparatus of claim 10, wherein the user device is on an off-path channel.

19. A system comprising:
a relying party configured to authenticate a user;
an authentication server configured to receive a request for a one-time password for authenticating the user at the relying party device; to determine a machine readable form of the one-time password, wherein the machine readable form is deliverable from a user device associated with the user to the relying party device over an air gap between the user device and the relying party device; and to transmit the one-time password and a flag indicating the machine readable form to the user device; and
the user device configured to use the one-time password as a seed to generate the machine readable form.

20. A system of claim 19, wherein the user device is configured to receive the one-time password and the flag; and to use the one-time password to generate the machine readable form as indicated by the flag.

* * * * *